United States Patent [19]

Kodaira et al.

[11] 4,153,360
[45] May 8, 1979

[54] FOCAL PLANE SHUTTER FOR A CAMERA

[75] Inventors: Noboru Kodaira, Tokyo; Nobuo Tezuka; Mitio Senuma, both of Tokyo; Teiji Hashimoto, Kawasaki; Masanori Uchidoi, Yokohama; Yukio Iura, Yokosuka, all of Japan

[73] Assignee: Canon Kabushiki Kaisha, Tokyo, Japan

[21] Appl. No.: 764,287

[22] Filed: Jan. 31, 1977

[30] Foreign Application Priority Data

Feb. 5, 1976 [JP] Japan .................................. 51-11688

[51] Int. Cl.$^2$ ........................... G03B 9/28; G03B 9/34
[52] U.S. Cl. .................................... 354/241; 354/243
[58] Field of Search ......... 354/241, 204, 205, 242-244

[56] References Cited

U.S. PATENT DOCUMENTS

| 3,687,044 | 8/1972 | Watanabe | 354/242 |
| 3,739,704 | 6/1973 | Akiyama | 354/243 |
| 3,913,117 | 10/1975 | Endo et al. | 354/205 X |

Primary Examiner—John Gonzales
Attorney, Agent, or Firm—Toren, McGeady and Stanger

[57] ABSTRACT

A focal plane shutter for a camera includes a shutter unit casing for supporting a shutter mechanism. A rotatable body is connected with the shutter for winding up the shutter to a charged position. A shutter driving spring is also connected with the shutter mechanism for driving the shutter and a holding member is coupled with the rotatable body for holding the shutter mechanism in a charged position. A driving shaft carrying a driving gear is coupled to the rotatable body through a transmission gear and a clutch. A spring is coupled with the clutch to urge the clutch in a direction for releasing engagement between the transmission gear and the rotatable body. The driving gear has a plane section on its circumferential periphery spacing adjacent teeth apart so that engagement between the driving gear and the transmission gear is released when the rotatable body is held so that the transmission gear and the clutch can rotate, under the influence of the spring, back to the initial position.

1 Claim, 6 Drawing Figures

FOCAL PLANE SHUTTER FOR A CAMERA

BACKGROUND OF THE INVENTION

1. Field of the Invention

The present invention relates generally to cameras, and more particularly, change to an improvement in the winding up device of a focal plane shutter in a camera.

2. Description of the Prior Art

In the case of a camera provided with a focal plane shutter, generally the film winding up mechanism is functionally engaged with the shutter winding up mechanism through a series of gears in such a manner that by means of operating a winding up lever the film winding up and shutter winding to a charged position are carried out at the same time. A clutch provided in the series of gears is released at the time of shutter release in such a manner that only the shutter mechanism is rotated along the reverse direction to that at the time of the winding up operation. One end of the shutter plane is fixed on the winding up drum so as to be wound up on the drum at the time of the shutter charge and to be pulled in the inverse direction in order to carry out the opening and closing operation at the time of the shutter release. The running speed of the shutter plane depends upon the strength of a driving spring and the moment of inertia of the rotary bodies such as the winding up drum rotated in functional engagement with the shutter plane, the gears and so on. When the gear series is designed so as to be rotated together with the shutter winding up drum, the running speed of the shutter plane is so low that it is necessary in the short shutter time that the width of the exposure slit formed with the shutter planes should be remarkably small, whereby the shutter efficiency is inferior while the exposure time varies due to a slight error in the slit width while the exposure in every part of the picture can not be uniform. This is inconvenient for obtaining high exposure accuracy of the shutter.

SUMMARY OF THE INVENTION

In order to eliminate the foregoing disadvantages it has been proposed that gears with plane sections be provided in the series of the gears used for the shutter winding up operation in such a manner that the gears directly provided on the shutter drum can be taken out of the series of the gears.

An object of the present invention is to improve the shutter accuracy and to lower the moment of inertia of the rotary bodies in the camera shutter mechanism.

For this purpose in accordance with the present invention, when the shutter has been wound up, the winding up gear is also separated from the shutter winding up drum so as to be rotated along a reverse direction in such a manner that at the time of the shutter release only the essential members are rotated together with the drums.

The present invention will be described in connection with an embodiment thereof as applied to a single reflex camera, in which the shutter time is controlled by means of an electrical control circuit.

DESCRIPTION OF PREFERRED EMBODIMENT

Figure 1:
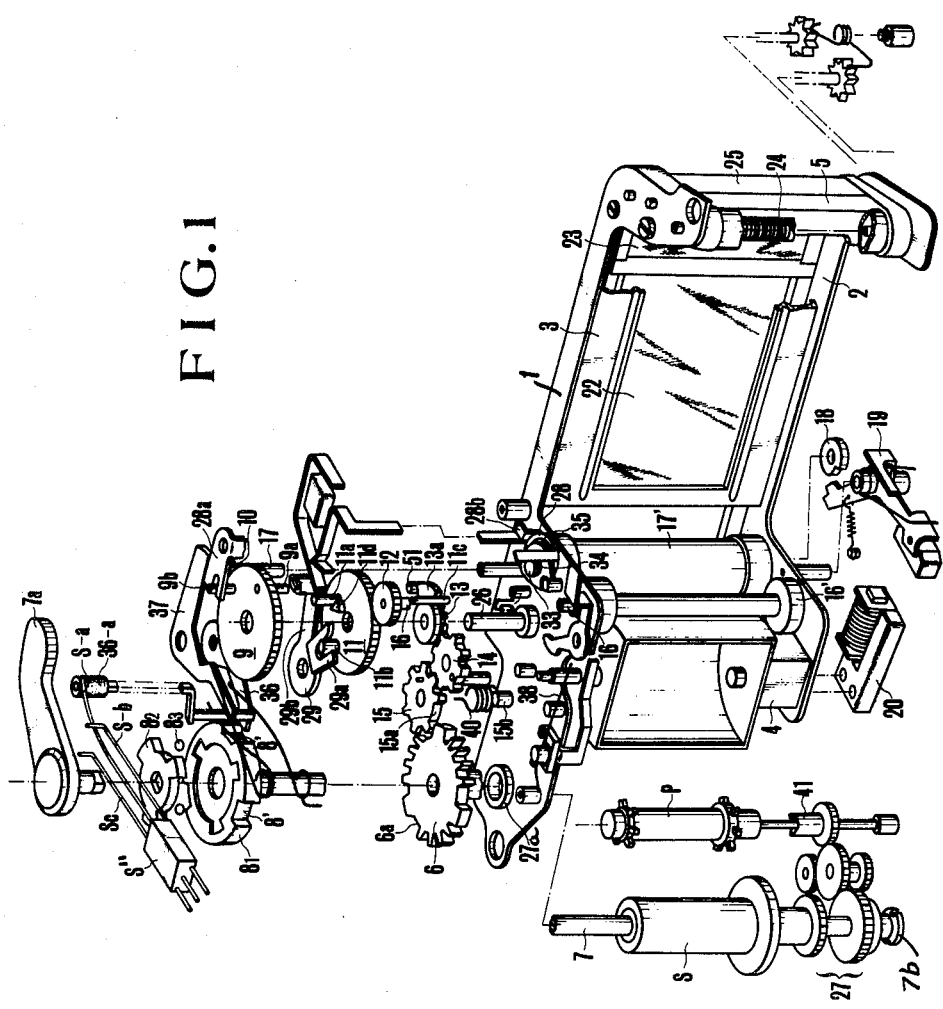
FIG. 1 is an exploded perspective view showing the composition of the shutter unit.
Figure 2:
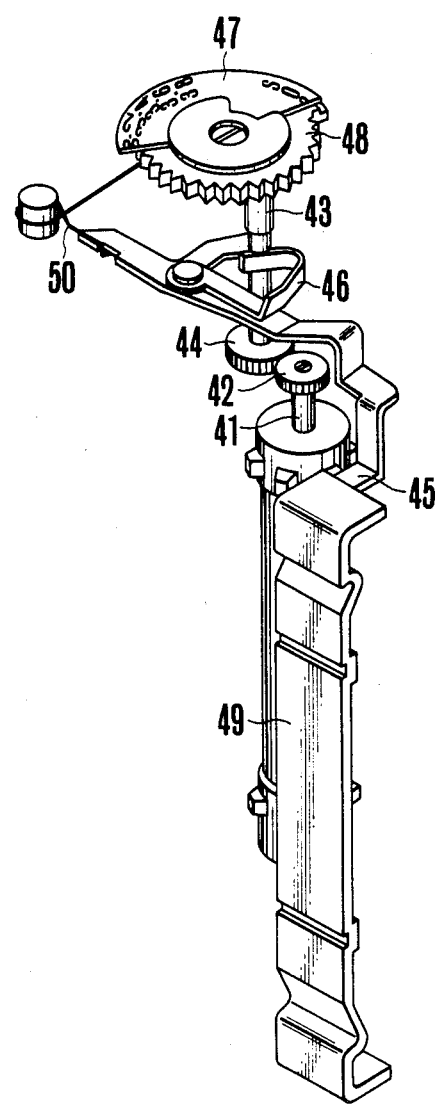
FIG. 2 is a perspective view showing the composition of the film counter.

In FIG. 1, 1 and 2 are base plates on which the shutter mechanism is to be mounted, being supported by means of support columns 4, 5. Support columns 4 and 5 are preferably made of aluminium dicast, plastic of support columns 4, 5. Support columns 4 and 5 are preferably made of aluminum diecast, plastic or other suitable material for this purpose. as the battery box. A light shading plate 3 is mounted at the position of the photographic opening so as to control the light coming from the lens system and to provide rigidity to the shutter unit casing, which consists of the base plates 1 and 2 as well as the support columns. The shutter mechanism, to be explained in greater detail hereinafter, is mounted on the upper and the lower base plates 1 and 2 which have a notch for receiving the mirror box as is shown in the drawing.

Turning now to the shutter mechanism, a master shaft 26 is fixed on the upper base plate 1. A front shutter plane master gear 11 and a rear shutter plane master gear 9 are rotatably mounted on master shaft 26. The front shutter plane master gear 11 is engaged with a front shutter plane pinion 12 carried on a pinion shaft 16 pivotally mounted on the upper and the lower base plates 1 and 2. The rear shutter plane master gear 9 is engaged with a rear shutter plane pinion 10 carried on a rear shutter plane pinion shaft 17 pivotally mounted on the upper and the lower base plates 1 and 2. A front shutter plane drum 16' and a rear shutter plane drum 17' are respectively fixed on the shafts 16 and 17. Further, a front shutter plane spring drum 25 and a rear shutter plane spring drum 24 are pivoted between the other ends of the upper and the lower base plates 1 and 2. Between these spring drums 25, 24 and the drums 16', 17' the front shutter plane 23 and the rear shutter plane 22 are respectively provided. A winding up shaft 7 is functionally engaged with the winding up lever 72 through conventional one way clutches $8_1$, $8_2$ and $8_3$, being supported by bearing 27a and fixed as one body with a clutch case and a winding up gear 6. A joint 7b is provided at the lower end of the shaft 7 for coupling with a motor drive device. Rotation of the winding up lever 7a is transmitted to a sprocket P and a spool S through a conventional gear series 27 so as to wind up the film in the camera. This is also transmitted from the gear 6 to a shutter winding up gear 13 through transmission gears 14 and 15.

Figure 3:
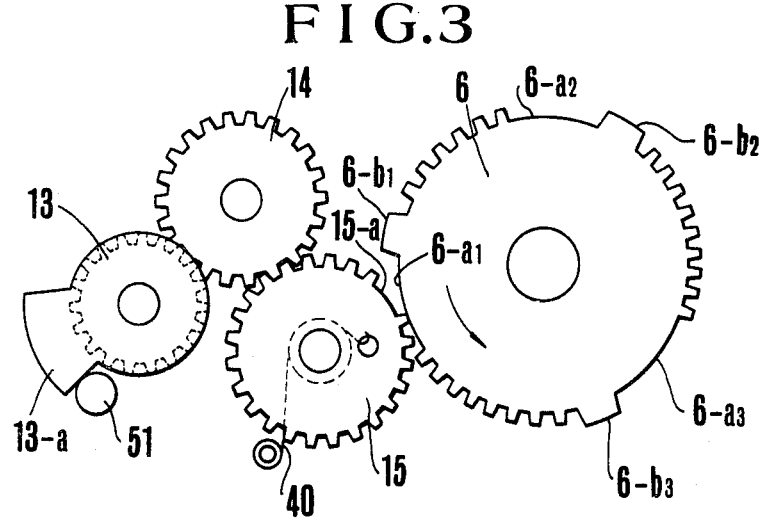
FIG. 3 is an enlarged plan view showing the winding up gear series.

The shutter winding up gear series is shown in FIG. 3. This series includes the winding up gear 6, which has plane sections $6\text{-}a_1$, $6\text{-}a_2$ and $6\text{-}a_3$ each of which have a length corresponding to the length of approximately 3–4 teeth. The plane sections are provided at equal distances from each other. The winding up gear 15 is engaged with the winding up gear 6 and has a plane section 15-a having a length corresponding to the length of about 1–2 teeth. This plane section 15-a serves to secure the first engagement of the winding up gear 6 with the gear 15. Abutments $6\text{-}b_1$, $6\text{-}b_2$ and $6\text{-}b_3$ are located next to the plane sections $6\text{-}a_1$, $6\text{-}a_2$ and $6\text{-}a_3$ of the winding up gear 6. The abutments 6-$b_1$, 6-$b_2$ and 6-$b_3$ are designed so as to be engaged only with the plane section 15-a of the transmission gear 15, avoiding engagement with other teeth even in the case of an unusual operation. Further, when the depth of the plane section 15-a of the transmission gear 15 and the height of the abutments 6-$b_1$, 6-$b_2$ and 6-$b_3$ are chosen to be correspondingly large, the smooth engagement of the gear 15 with the gear 6 can be obtained without any irregularlity due to the plane sections. Further, a return spring 40 is mounted on the shaft 15b of the transmission gear 15 in such a manner that the plane sections 6-$a_1$, 6-$a_2$ and 6-$a_3$ of the winding up gear 6 assume the position facing the teeth of the transmission gear 15. Because of the spring 40 engagement of the gear 15 with the gear 6 is released with transmission gear 15 automatically in the state before winding up. The shutter winding up gear 13 engaged with the transmission gear 15 through the gear 14 is provided with a fan shaped abutment 13-a. The position of abutment 13-a is controlled by means of a stopper 51. Further, the abutment 13-a of the gear 13 is engaged with a pin 11-c of the front shutter plane master gear 11, while a pin 11-a of the front shutter plane master gear 11 is engaged with a pin 9-a of the rear shutter plane master gear 9. As a result, when the shutter winding up gear 13 is rotated, the front shutter plane master gear 11 as well as the rear shutter plane master gear 9 are rotated. S″ is the change over switch for the motor drive device. When the movable contact piece S-a is in contact with the fixed contact piece S-c, a signal for stopping the winding up motor of the motor drive device is produced so that shutter release is possible. With the movable contact piece S-a in contact with the fixed contact piece S-b, the signal for starting the winding up motor is produced. The sprocket shaft 41 is shown in FIG. 2. A film number counting disc gear 42 is provided at the end of sprocket shaft 41, a film number counting disc driving gear 44 provided at the end of a one tooth gear 43 is engaged by gear 42. The one tooth gear 43 is engaged with an index gear 48 of a film number counting disc 47 and is pressed by spring 46 fixed on O-return lever 45. When the winding up operation has been carried out, the one tooth gear 43 carries out one rotation through the film number counting disc gear 42 as well as the driving gear 44. At the time of the winding back operation, the index gear 48 rotates in the direction along which the film number is counted down. The O-return lever 45 is kept by means of the back cover 49 at the position shown in the drawing, whereby the back cover 49 is opened the lever 45 is rotated along the clockwise direction by means of the O-return spring 50 so as to release the pressing of the one tooth gear 43 and to bring the film number counting disc 47 to a zero indication.

Figure 4:
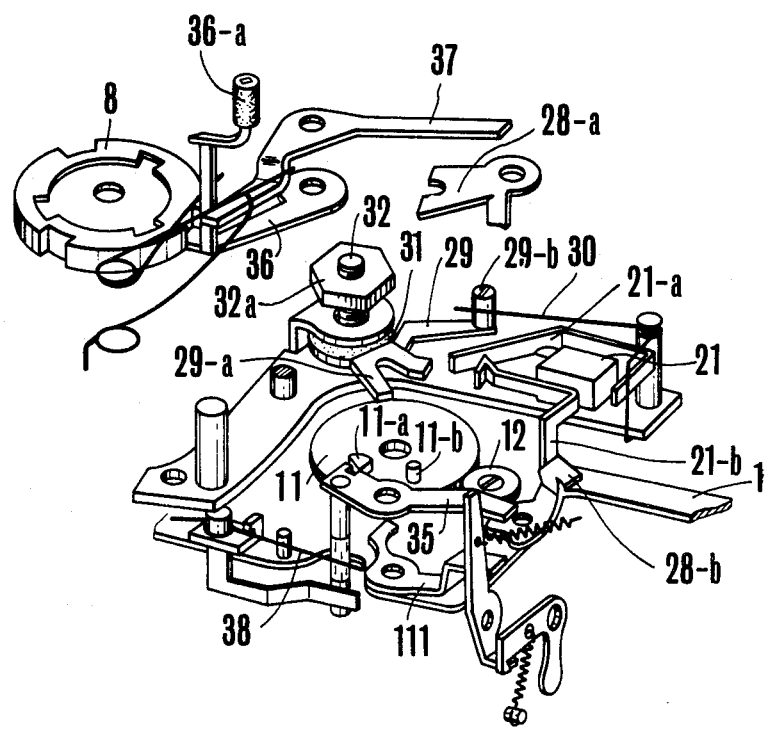
FIG. 4 is a perspective view showing the composition of the front shutter plane brake.

FIG. 4 shows the front shutter plane brake illustrated in FIG. 1. A Y-shaped arm 29-a of the front shutter brake lever 29 is engaged with the pin 11-b of the front shutter plane master gear 11 before the front shutter plane has run so as to brake the front shutter plane, rotating the front shutter plane brake lever 29 around the shaft 32. A spring 30 is engaged with another arm 29-b of the front shutter brake lever 29 so as to normally urge the front shutter plane brake lever 29 in a counter clockwise direction when viewing the drawing. A nut 32a is pressed against the shaft by means of a screw so as to be pressed against the brake lever 29 through a friction member 31, which may be leather, plastic, etc. The front shutter plane braking strength is thus a combination of the strength of the spring 30 and the frictional strength. Further, the end 29-a of the brake lever 29 is of fork shape so that the pin 11-b is prevented from springing back along the reverse direction to the running of the front shutter plane at the time at which the pin 11-b is engaged with the end 29-a of the brake lever 29. Further, when the front shutter plane brake lever 29 is rotated, the contact piece 21-a is brought into contact with the contact piece 21-b with the other end 29-b of the front shutter plane brake lever 29 so as to close a flash light synchronization contact 21. At the time of charging the shutter the front shutter plane master gear 11 is rotated so that the pin 11-b advances, pushing one arm of the fork shaped part of the brake lever 29, bringing the front shutter plane into the operable state also by means of the strength of the spring. 38 is a count switch of an electronic shutter circuit not shown in the drawing. Switch 38 is closed and opened in functional engagement with the lever 35 for holding the front shutter plane master gear 11. In FIG. 1, 28 is the rear shutter plane brake lever, 30 is the shaft provided with a spring and 35 is the friction member consisting of leather, etc. This rear shutter plane lever 28 is designed in the same way as is the front shutter plane lever so that the one end 28-a is engaged with the pin 9-b on the rear shutter plane master gear 9 so as to brake the rear shutter plane. When the rear shutter plane has run, the winding up stop release lever 37 and the winding up stop lever 36 are rotated in functional engagement with the end 28-a of the rear shutter plane brake lever 28, whereby the end 36-a of the winding up stop lever 36 falls into the groove 8′ of the winding up stop cam $8_1$ while the switch S is changed over. Further, the other end 28-b of the rear shutter plane brake lever 28 interrupts the contact by means of the contact piece 21-b so as to open the second flash light synchronization contact. A magnet 20 is provided for holding a holding claw 18 of the rear shutter plane pinion shaft 17, attracting the holding lever.

Figure 5:
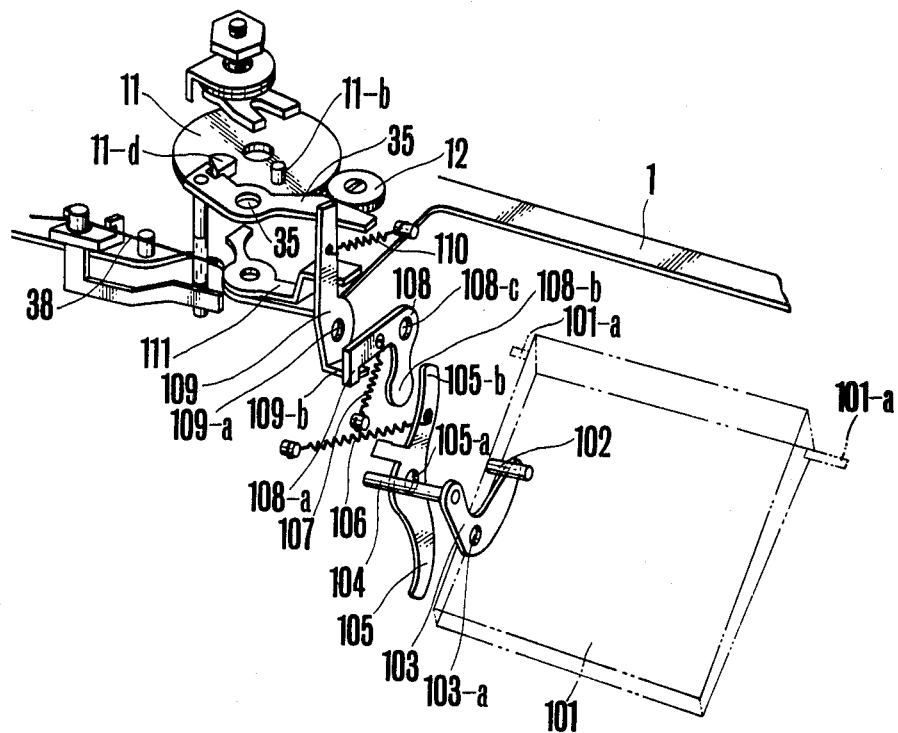
FIG. 5 is a perspective view showing the mirror up mechanism.

FIG. 5 shows the mechanism of the mirror, whereby 101 is a mirror receiver for supporting the mirror, being rotatably pivoted on the shaft 101a on the side wall of the mirror box. 102 is a pin fixed on the mirror receiver, 105 is a lever rotatably pivoted on a shaft 105a, which is urged in the counter clockwise direction by means of the spring 106. 103 is a lever pivoted on a shaft 103a. One arm of lever 103 is engaged with a pin 102 while the other arm of lever 103 carries a pin 104 to be engaged with the lever 105. 35 is a lever for holding the front shutter plane master gear 11. Lever 35 is rotatably pivoted on a shaft 35a. An end can on lever 35 is engaged with the projection 11-d of the gear 11.

Lever 109 is rotatably mounted on a shaft 109a, and is urged in the clockwise direction by means of a spring 110. One arm of lever 109 is engaged with the end of the afore mentioned holding lever 35. A holding lever 108 is rotatably mounted on a shaft 108c. Hook part 108a of lever 108 is engaged with the bent part 109b of the afore mentioned lever 109 while the other end 108b of lever 108 is engaged with the end 105b of the afore mentioned lever 105.

The operation of the foregoing described mechanism will now be described.

When the winding up lever 7a is operated, the abutment 6-b of the winding up gear 6 is at first engaged with the plane section 15-a of the transmission gear 15 so as to rotate the gear 15 by 125°. The rotation of this transmission gear 15 is transmitted to the shutter winding up gear 13 on the master shaft 26 through the gear 14. The rotation of the projection 13-a of the winding up gear 13 is transmitted to the front shutter plane master gear 11 through the pin 11-c and also to the rear shutter plane master gear 9 through the pin 11-a and 9-a. Thus the front shutter plane pinion shaft 16 as well as the rear shutter plane pinion shaft 17 are rotated so that the front and the rear shutter plane 23 and 22 are wound up to the side of the pinion shaft and so that the springs in the spring drums 24 and 25 are charged. By means of the rotation of the front shutter plane master gear 11 as well as of the rear shutter plane master gear 9, the brake levers 28 and 29 respectively engaged with the pins 9-b and 11-b rotate along the counter clockwise direction. When the front shutter plane brake lever 29 is rotated, the end 29-b opens the first synchronization contact 21. Further, when the rear shutter plane brake lever 28 is rotated along the counter clockwise direction, the end 28-a retires from the winding up stop release lever 37 so that the winding up stop lever 36 is rotated along the clockwise direction by means of the spring engaged with the lever 37 and the winding up stop lever 36. The projection 36b of this winding up stop lever 36 falls into the groove of the winding up stop cam $8_1$ making one body with the winding up gear 6 so as to stop the winding up while the end 36-a brings the movable contact piece S-a in contact with the fixed contact piece S-c of the switch S'' by means of a spring so as to stop the winding up motor in the motor drive device (not shown in the drawing), so that the shutter can be released. Further, the other end 28-b of the rear shutter plane brake lever 28 is brought into contact with the contact piece 21-b so as to close the second synchronization contact. Further, when the winding up gear 6 is rotated the charge lever 111 is rotated along the clockwise direction through the transmission gears 15 and 14 so that end 109-b of the lever 109 is engaged with the hook part 108-a of lever 108. Further, when the front shutter plane master gear 11 is rotated into the position at which the projection 11d is held by means of the holding lever 35, the holding claw 18 provided on the rear shutter plane pinion shaft 17 is brought into the position at which the holding claw 18 is held by means of the holding lever 19. When the front shutter plane master gear 11 as well as the rear shutter plane master gear 9 are held in this way, the plane section 6-$a_2$ of the winding up gear 6 comes to be positioned with respect to the transmission gear 15 in such a manner that the engagement of the transmission gear 15 with the winding up gear 6 is released. Thus the winding up gear 13 resumes the position before the winding up by means of the spring together with the transmission gears 15 and 14.

Further along with the winding up operation of the winding up shaft 7 the sprocket 41 is rotated, whereby the rotation of the sprocket is transmitted to the one tooth gear 43 through the film number counting disc gear 42 and the driving gear 44 so as to rotate the index gear 48 of the film number counting disc 47 an increment corresponding to one picture.

When the shutter of the camera is then released, the automatic aperture mechanism (not shown in the drawing) operates, the not shown hook holding the lever 105 is released and the lever 105 is rotated along the counter clockwise direction by means of the spring 106. Thus, the lever 103 is rotated along the counter clockwise direction through the pin 104, while the mirror receiver 101 is rotated along the clockwise direction, so that the mirror is raised. After or immediately before the termination of the mirror raising operation the lever 108 is rotated along the clockwise direction by means of the lever 105 so as to release engagement of the hook part 108-a with the spring 109. Thus the lever 109 is rotated along the clockwise direction by means of the strength of the spring 110. The front shutter plane holding lever 35 is thereby rotated along the counter clockwise direction. Thus engagement of the front shutter plane holding lever 35 with the projection 11-d of the front shutter master gear 11 is released in such a manner that the front shutter plane master gear 11 is rotated. Thus the pinion gear 12 and the pinion shaft 16 are rotated so that the front shutter plane 23 starts to run. Immediately before the front shutter plane has run, one end of the front shutter plane brake lever 29 is engaged with the pin 11-b on the front shutter plane master gear 11 in such a manner that the front shutter plane brake lever 29 is rotated around the shaft 32 so as to brake the front shutter plane. Further, the contact piece 21-a is brought into contact with the contact piece 21-b by means of one end 29-b of the front shutter plane brake lever 29 so as to close the first synchronization contact 21, whereby the speed light device is ready to operate. Hereby in functional engagement with the front shutter plane holding lever 35 the count start switch 38 of the not shown electronic shutter circuit is opened in such a manner that after the lapse of a certain time, determined by means of the time constant circuit, the magnet 20 stops attracting the rear shutter plane holding lever 19. Thus the engagement of the holding lever 19 with the holding claw 18 is released so that the rear shutter plane master gear 9 is rotated so that the rear shutter plane 22 starts to run to terminate the exposure. After the rear shutter plane has run, the pin 9-b on the rear shutter plane master gear 9 is engaged with the end 28-a of the rear shutter plane brake lever 28 so that the rear shutter plane brake lever 28 is rotated to brake the rear shutter plane 23. Further, when the end 28-b of the rear shutter plane brake lever 28 is brought out of the contact with the contact piece 21-b the second synchronization contact is opened. Further, when the rear shutter plane brake lever 28 is rotated, the winding up stop release lever 37 is rotated along the counter clockwise direction by means of the end 28-a so as to take the winding up stop lever 36 out of the groove 8' of the winding up stop cam 8 while the movable contact piece S-a is brought in contact with the fixed contact piece S-b of the switch S'' so as to enable the winding up motor of the motor drive device to rotate.

Figure 6:
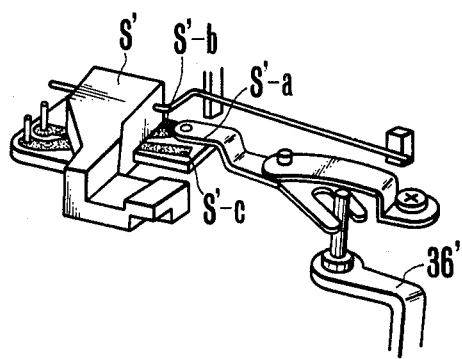
FIG. 6 shows a variation of the switch for the motor drive shown in FIG. 1.

FIG. 6 shows another embodiment of the switch S'' designed as a slide switch in order to prevent the variation of the resistance between the contacts due to shocks at the time of shutter release, mirror raising, automatic diaphragm closing and so on which occur in the single reflex camera. Namely, by means of the winding up stop lever 36', the contact piece S'-a of the slide lever can be changed over between the fixed contact pieces S'-b and S'-c.

As explained above, in accordance with the present invention the winding up gear series is designed so as to resume the initial position when the winding up operation has been terminated so that at the time of the shutter operation the winding up gear series assumes the initial position while only the master gear, the pinion shaft and the drums are rotated so that the moment of inertia of the shutter decreases as compared with the conventional one, the running speed of the shutter planes is increased and the slit width at the small shutter time is increased so that shutter accuracy can be improved. Further, an exclusive member is provided as the holding claw release member of the front shutter plane in such a manner that only the holding claw of the exclusive member is released when the mirror is raised up so that the correct shutter start time can be obtained free from influences such as temperature, the humidity and so on. Further the change over switch for the motor drive device in the shutter unit, the synchronization switch and the count switch are constituted with gear series, levers and so on in a simple way so as to be capable of sequence control.

What is claimed is:

1. A focal plane shutter for a camera comprising:
   (a) a shutter unit casing including a pair of base plates and supporting columns extending between said base plates;
   (b) shutter plane means supported by said shutter unit casing;
   (c) a rotatable body connected with said shutter plane means for winding up said shutter plane means to a charged position;
   (d) a rotatable shutter driving spring connected with said shutter plane means, said shutter driving spring being charged for rotation in a direction reverse to the winding direction when said shutter means is wound up;
   (e) holding means for holding said rotatable body when said shutter means is in said charged position;
   (f) a driving shaft coupled with said rotatable body for winding up said vshutter means to said charge d position, and means for rotating said driving shaft;
   (g) a driving gear fixed on said driving shaft for coupling said shaft to said rotatable body;
   (h) a transmission gear cooperating with said driving gear for transmitting rotation of said driving gear to said rotatable body;
   (i) clutch means carried between said transmission gear and said rotatable body;
   (j) spring means coupled with said clutch means urging said clutch means in a direction for releasing engagement between said transmission gear and said rotatable body;
   (k) said driving gear having teeth located on the circumferential periphery thereof and a plane section on the circumferential periphery spacing said teeth apart with said plane section having an angular extent at least equal to the angular extent of three side teeth so that engagement between said driving gear and said transmission gear is released when said rotatable body is held by said holding means, whereby said transmission gear and said clutch means rotate to an initial position under the influence of said spring means, said driving gear also having an abutment located on the circumferential periphery thereof and having an angular extent greater than the angular extent of one said tooth thereon said abutment located at one end of said plane section spacing said plane section from said teeth thereon, said abutment following said plane section in the direction of rotation of said driving gear, and said transmission gear having teeth on the circumferential periphery thereof and a plane section spacing said teeth thereon apart and said plane section having an angular extent corresponding to the angular extent of said abutment on said driving gear for securing initial engagement of said transmission gear with said driving gear for winding up.

* * * * *